Feb. 11, 1969    J. M. CLARK ET AL    3,426,925
APPARATUS FOR LAYING PROTECTIVE MATERIAL ON EMBANKMENTS
Filed Oct. 27, 1966    Sheet 3 of 4

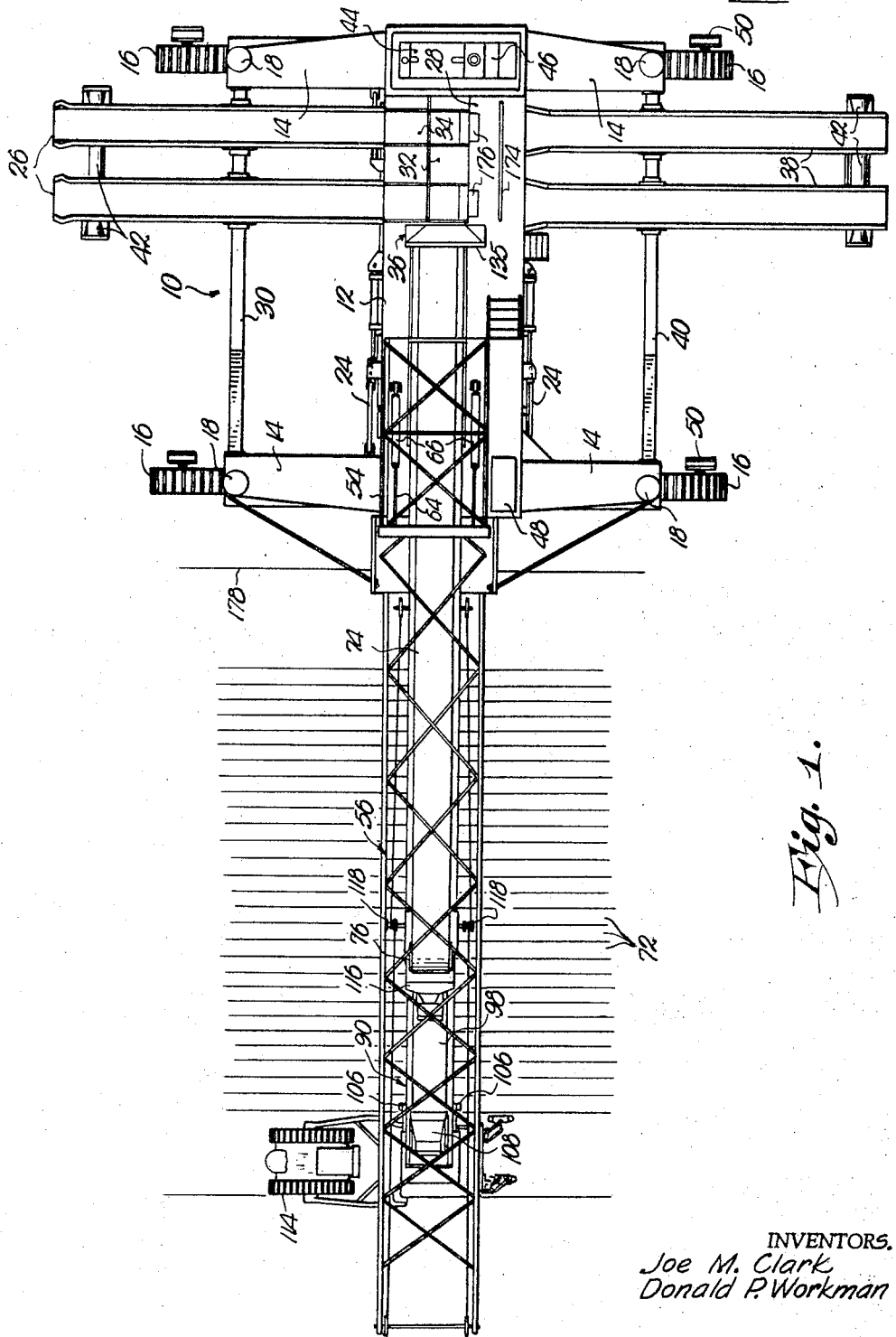

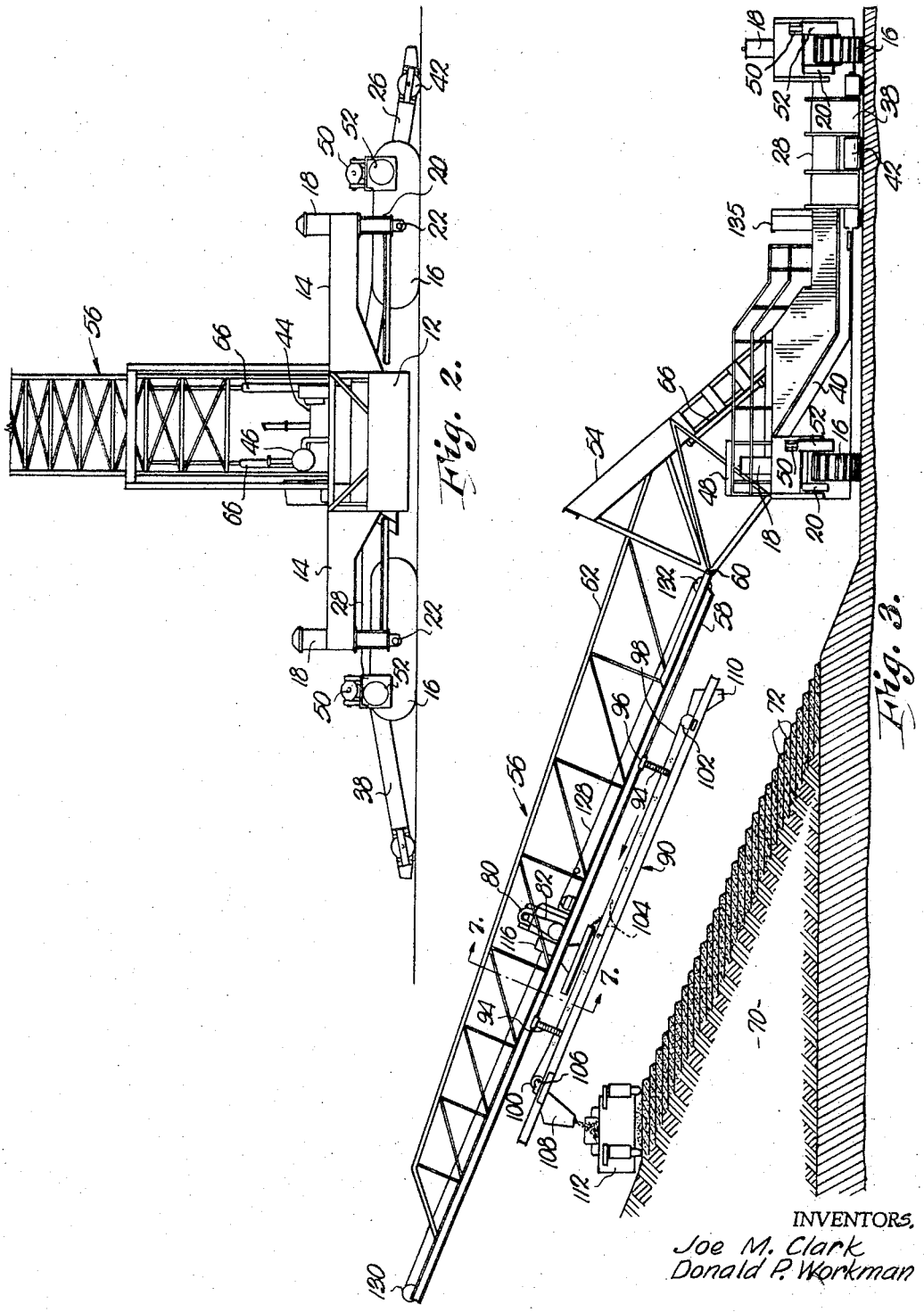

INVENTORS.
Joe M. Clark
Donald P. Workman

BY Hovey, Schmidt, Johnson & Hovey
ATTORNEYS

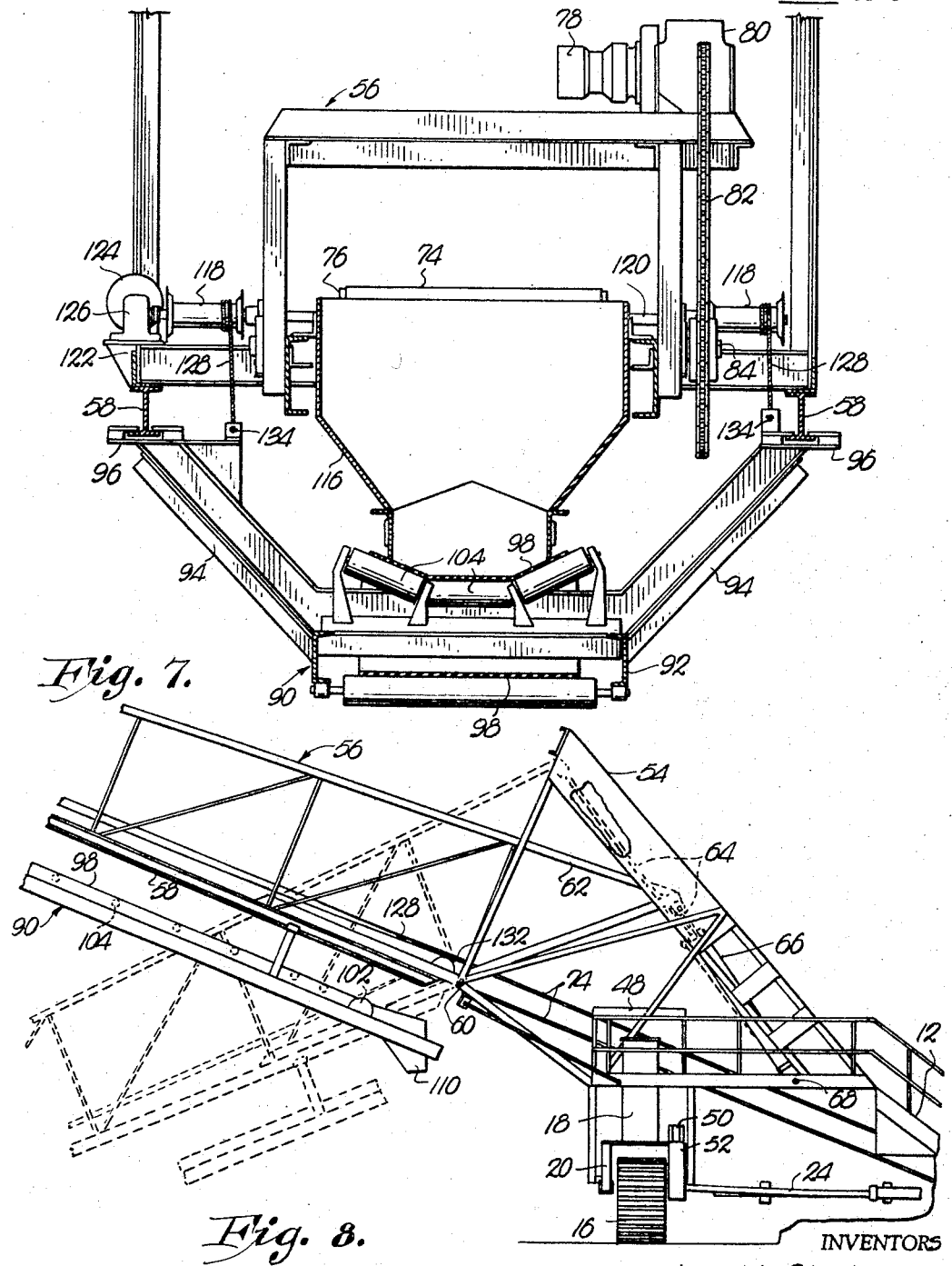

United States Patent Office 3,426,925
Patented Feb. 11, 1969

3,426,925
APPARATUS FOR LAYING PROTECTIVE
MATERIAL ON EMBANKMENTS
Joe M. Clark, Mission, and Donald P. Workman, Kansas City, Kans., assignors to List & Clark Construction Company, Overland Park, Kans., a corporation of Missouri
Filed Oct. 27, 1966, Ser. No. 590,031
U.S. Cl. 214—46                                 6 Claims
Int. Cl. B65g 67/24, 57/00, 37/00

ABSTRACT OF THE DISCLOSURE

For the purpose of laying soil-cement on the surface of an earth embankment, a transport is provided which advances along the foot or crest of the embankment in forward and reverse directions. The transport has a hopper which is periodically resupplied with soil-cement by trucks that are driven onto the moving transport with the assistance of ramps carried thereby. A laterally extending boom is mounted on the transport and supports a primary conveyor which transfers the material from the hopper to a remote point on the boom at the end of the primary conveyor. A secondary, shuttle conveyor is suspended beneath the boom and receives the soil-cement as it is discharged from the outboard end of the primary conveyor. The shuttle conveyor is shiftable longitudinally of the boom, and the latter is swingable about a horizontal axis so that the ultimate discharge location of the soil-cement may be progressively shifted toward or away from the transport and elevated as required to discharge the soil-cement into a spreader which travels at the same speed as the transport and traverses the slope back and forth to lay the soil-cement thereon in overlapping, stair-stepped layers.

---

Figure 4:
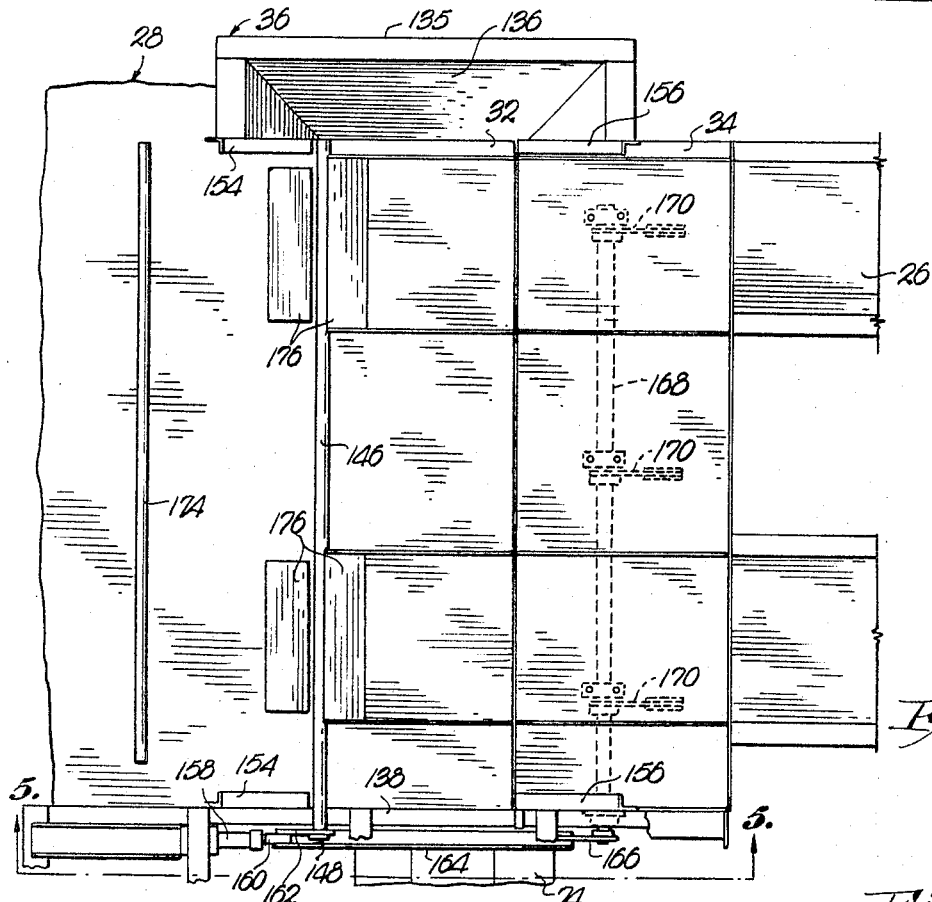

This invention relates to apparatus for laying a protective facing on earth embankments.

In the design and construction of earthfill dams, it is necessary to provide some means of protecting the embankment from the eroding effects of high winds, weather, and the waves of the impounded water. Many materials have been utilized for slope protection in the past, and such materials vary considerably in both cost and durability.

For many years riprap has perhaps enjoyed the greatest use of any material for this purpose. Few failures have been experienced and the material is usually locally available. However, when the dam site is located a considerable distance from the quarry, the cost of riprap slope protection increases materially to the point where consideration must be given to alternative techniques utilizing materials in the locality of the site.

This has particularly become the case in recent years with the rapid expansion of the development of water resources in this country. In many areas it has been found that high quality riprap is not available, necessitating long hauls of the material which may involve costs as great as six or eight times the usual costs encountered in riprap construction. This obviously produced the need for a method of slope protection that is more economical yet equally durable.

The search for a competitive slope protection material for these areas led to the use of soil-cement, a construction material developed in the 1930's as a base for highways. It will be appreciated, however, that in highway construction soil-cement is readily laid on the roadbed by relatively conventional construction equipment, such as tractor-drawn spreaders and the like. Additionally, soil-cement may be transported from the mixing site to the spreaders in dump trucks which utilize the flat roadbed as an access way.

An earthfill dam, however, has a sloping surface requiring that the protective facing be laid thereon by traversing the slope horizontally to deposit the material in overlapping, horizontal layers in stair-step fashion. Because of the slope, trucks and heavy equipment utilized in road construction are oftentimes unsuitable for use in laying a protective facing of soil-cement on the dam.

It is, therefore, the primary object of this invention to provide apparatus for laying soil-cement or similar construction materials on a sloping surface such as an earth embankment without employing large or heavy equipment in contact with the surface upon which the material is laid.

As a corollary to the foregoing object, it is an important aim of this invention to provide apparatus as aforesaid which deposits the material on the sloping surface in overlapping, horizontal, stair-stepped layers and yet feeds the material to the surface from a location off the surface, such as the foot or the crest of the embankment.

Another important object is to provide a mobile machine capable of repeatedly traversing the foot or the crest of an embankment while simultaneously transporting soil-cement or a similar facing material from a material receiver laterally of the path of travel of the machine to a discharge point in overlying relationship to the sloping surface upon which the material is to be laid.

A further object is to provide a machine as aforesaid having a transport which is provided with the material receiver upon which trucks loaded with soil-cement may be driven during operation of the machine so that the receiver may be continually supplied with the facing material to permit continuous operation of the machine.

Figure 5:
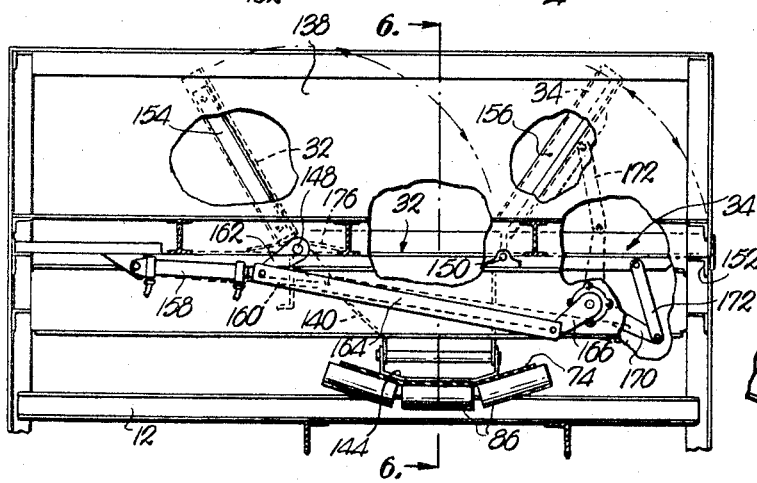
Figure 6:
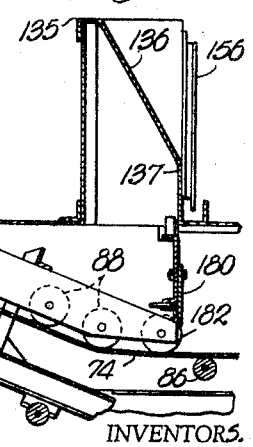

In the drawings:
FIGURE 1 is a plan view of the apparatus showing the same traversing the foot of an embankment;
FIG. 2 is a side elevational view of the apparatus;
FIG. 3 is a front elevational view showing the embankment in transverse section, the primary conveyor of the apparatus being removed for clarity due to visual interference with the winch line;
FIG. 4 is an enlarged, fragmentary plan view of the platform on the transport above the hopper;
FIG. 5 is a vertical sectional view taken along line 5—5 of FIG. 4, the supports for the conveyor rollers being removed for clarity;
FIG. 6 is a fragmentary, vertical sectional view taken along line 6—6 of FIG. 5;
FIG. 7 is a sectional view taken substantially along line 7—7 of FIG. 3, the chute at the upper end of the primary conveyor being shown in cross section; and
FIG. 8 is an enlarged, front elevational view of the lower end of the boom and the section of the transport to which it is mounted.

The apparatus of the instant invention comprises a transport provided with crawler tracks which advances along the foot or crest of an embankment in forward and reversing directions, normally along a single path of travel. The transport has a hopper which is periodically resupplied with soil-cement by dump trucks which are driven onto the moving transporting with the assistance of ramps carried thereby.

A laterally extending boom is mounted on the transport and supports a primary conveyor which transfers the material from the hopper to a remote point on the boom at the end of the primary conveyor. A secondary, shuttle conveyor is suspended beneath the boom and receives the soil-cement as it is discharged from the outboard end of the primary conveyor. The shuttle conveyor is shiftable longitudinally of the boom by virtue of a track arrangement provided by the lowermost structural members of the boom so that the ultimate discharge location of the soil-cement may be progressively shifted toward or away from the transport while the latter makes repeated passes. The material is laid on the slope in overlapping, stair-stepped layers by a small, tractor-driven spreader beneath the discharge end of the shuttle conveyor which travels at the same speed as the transport. Normally, the spreader is repositioned for each pass to distribute the material in uniform layers of desired thickness, width and interrelationship, the shuttle conveyor being progressively shifted as required to discharge the material into the spreader.

Specifically, with reference to the figures, the transport is broadly denoted by the numeral 10 and includes a central chassis 12 having four horizontal legs 14 extending fore and aft of transport 10. Chassis 12 is carried by four crawler track assemblies 16, an upright, hydraulic cylinder 18 being rigidly secured to the outer end of each leg 14. The piston (not visible in the figures) of each cylinder 18 extends downwardly and is joined to an inverted, U-shaped mount 20 which carries an axle 22 supporting the associated track assembly 16. It will be appreciated that axles 22 provide horizontal pivotal axes for track assemblies 16, vertical axes for steering of transport 10 being provided by the pistons themselves which are each rotatable about the axis of the corresponding cylinder 18. Hydraulically operated steering linkages 24 for two of the track assemblies 16 are visible in FIGS. 1 and 8.

An entrance ramp 26 at the rear of transport 10 terminates at its inner end at the rear edge of an elevated platform 28 on chassis 12. Ramp 26 is secured to the chassis and is also supported by a cross member 30 extending between the two rear legs 14. Platform 28 includes a pair of juxtaposed doors 32 and 34 which normally are closed and form a cover overlying a hopper 36 disposed beneath platform 28 (see FIGS. 4 and 5). Doors 32 and 34 may be opened to present extensions of hopper 36 and permit dumping of soil-cement into the hopper from a dump truck on platform 28, as will be fully set forth hereinafter. An exit ramp 38 extends forwardly from the front edge of platform 28 and is supported by chassis 12 and a cross member 40 interconnecting the two front legs 14. Both ramps 26 and 38 employ rollers 42 adjacent their outer ends which engage the ground, a set of three rollers 42 being illustrated for each ramp.

Particularly in FIG. 2, it may be seen that chassis 12 has a diesel engine 44 mounted thereon illustrated diagrammatically in association with a hydraulic pump 46 which is driven by engine 44. Pump 46 (or a number of pumps if required) forms the high pressure source of a hydraulic system utilized exclusively for the drive and control functions necessary for the operation of the apparatus. The various hoses forming connections between pump 46 and a number of hydraulic motors to be described hereinafter are not shown for clarity. A control console 48 on chassis 12 is occupied by the operator of the apparatus and contains the various hydraulic valves (not shown) manipulated by the operator to control the apparatus.

Power for the four crawler track assemblies 16 is provided by four hydraulic motors 50, each mounted on the associated assembly 16. A drive connection is effected between each motor 50 and the corresponding assembly 16 by a gear reduction transmission 52. Motors 50 are reversible so that transport 10 may be driven in either direction, reference hereinabove and hereinafter to front and rear portions of the transport being entirely arbitrary in a broad sense but utilized to clarify the description and designate the front and rear portions of the transport with respect to the direction in which the apparatus is illustrated as advancing in the figures.

A framework 54 at one side of chassis 12 adjacent the control console 48 extends upwardly from the chassis and supports a boom 56 which extends laterally from transport 10. Boom 56 includes a pair of lowermost, parallel I-beams 58 which are pinned at their inner ends at 60 to framework 54. Pins 60 define a horizontal axis for swinging movement of boom 56 extending fore and aft of transport 10. The uppermost frame members 62 of boom 56 are pivotally connected to a pair of piston rods 64, the latter forming a part of a pair of hydraulically operated piston and cylinder assemblies 66. The lower ends of the two cylinders of assemblies 66 are pinned to chassis 12 as indicated at 68. FIGURE 8 illustrates that boom 56 may be shifted from an upwardly extending position (shown in full lines) to a downwardly extending position (shown by broken lines) through operation of the piston and cylinder assemblies 66. In this manner, the inclination of boom 56 with respect to transport 10 is infinitely adjustable between limits determined by the throw of piston rods 64. By viewing FIG. 3, it will be appreciated that this feature enables boom 56 to be disposed in approximate parallelism to the surface of an earth embankment 70 upon which soil-cement or a similar material is to be laid in layers shown at 72.

A primary conveyor of the continuous belt type extends along approximately the inner one-half of boom 56 and includes a conveyor belt 74 trained around a drive cylinder 76 rotatably supported by boom 56 intermediate the ends thereof, (FIGS. 1 and 7). A hydraulic motor 78 drvies cylinder 76 through a gear reduction transmission 80 and a chain and sprocket assembly 82, the latter interconnecting transmission 80 with one end of an axle 84 journalled in boom 56 and supporting cylinder 76. Rollers may be spaced along boom 56 as needed to support the upper and lower stretches of belt 74, such rollers being omitted from the illustrations herein for clarity.

FIGURES 4–6 and 8 reveal that the inner portion of conveyor belt 74 extends into the interior of chassis 12 and thence beneath the normally closed doors 32 and 34 into underlying relationship to hopper 36. The upper stretch of belt 74 passes over a set of three rollers 86 (FIG. 5) beneath hopper 36, the rollers 86 being arranged as illustrated to impart a transversely concave configuration to the upper stretch of belt 74. As many roller sets as required may be utilized to maintain this concave configuration so that the conveyor will readily transport the material without loss. A plurality of guide wheels 88 (FIG. 6) change the attitude of the upper stretch of belt 74 from horizontal to inclined as the belt passes from the hopper toward boom 56.

A discharge unit in the form of a secondary, shuttle conveyor 90 is carried by beams 58 therebelow, conveyor 90 including an elongated frame 92 provided with two pairs of opposed, upwardly extending mounting arms 94 spaced longitudinally of frame 92. The upper end of each arm 94 is provided with a slotted head 96 which slidably receives the lower flanges of one of the I-beams 58 (FIG. 7). Thus, beams 58 effectively form rails from which conveyor 90 is suspended and along which the conveyor may be shifted longitudinally of boom 56.

Conveyor 90 has a continuous belt 98 trained around a drive drum 100 adjacent the outer end of frame 92, and an idler drum 102 adjacent the inner end of frame 92. A plurality of sets of three rollers 104 are mounted on frame 92 and support the upper stretch of belt 98 to form the same into a transversely concave configuration. Drum 100 is driven by a reversible hydraulic motor 106 through a gear reducer, drums 100 and 102 defining the discharge ends of unit 90. Discharge chutes 108 and 110 are located adjacent drums 100 and 102 respectively to direct the soil-cement or other material downwardly into a spreader 112 below the chute utilized. It will be appreciated that unit 90 discharges alternately from its two ends, depending upon the direction of movement of belt 98. The spreader 112 is pushed by a small tractor 114 (FIG. 1) at the same speed as transport 10.

It will be noted that a chute 116 is provided at the upper end of primary conveyor belt 74 on the outboard side of drive cylinder 76 for the purpose of directing material discharged from the outer end of the primary conveyor downwardly onto the upper stretch of the secondary conveyor belt 98. Material is delivered to belt 98 at some point between its ends depending upon the position of conveyor 90 relative to transport 10. It should be understood that this position must be changed periodically as the location of spreader 112 is changed to lay the soil-cement in layer fashion. This is readily accomplished by a power-operated winch on boom 56 which comprises a pair of winch drums 118 (see particularly FIG. 7) rigid with a common shaft 120 journalled on boom 56. Drums 118 are on opposite sides of boom 56, an outwardly extending mount 122 being provided on one side of boom 56 which supports a reversible boom 56, an outwardly extending mount 122 being provided on one side of boom 56 which supports a reversible hydraulic motor 124 operably coupled to the adjacent drum 118 by a gear reduction transmission 126. A winch line 128 is wrapped around each drum 118 and extends to the outer end of boom 56 where the line is trained around a sheave 130 and thence returns along the entire length of the boom to a sheave 132 at the inner end thereof adjacent the pivotal connection 60. The lines 128 then return to respective drums 118 to form an endless connection with the drums.

It may be seen in FIG. 7 that each suspension arm 94 for conveyor 90 has a tie eyelet 134 at its upper end adjacent head 96, the eyelet 134 providing a tie point for the lower stretch of the winch line 128 so that conveyor unit 90 will move with the line in either direction as drums 118 are rotated.

Referring particularly to FIGS. 1 and 4–6, it will be seen that the hopper 36 which receives the material to be conveyed to discharge unit 90 is formed in part by an upstanding wall structure 135 on platform 28 which defines an end wall 136 of the hopper sloping downwardly from the top of structure 135 and then vertically downwardly beneath the platform from a horizontal line of bend 137 (FIG. 6). The remainder of the hopper is defined by an opposing end wall 138, a sloping sidewall 140 beneath platform 28 interconnecting end walls 136 and 138, and an opposing, vertical sidewall 142 beneath platform 28. The four hopper walls extend downwardly from the plane of platform 28 and converge as the lowermost portion of the hopper is approached, a belt-forming guide member 144 (FIG. 5) spanning the hopper sidewalls 140 and 142 beneath the lowermost edges thereof. Member 144 is sufficiently narrow in width to not interfere with flow of material down through the hopper and onto the upper stretch of conveyor belt 74.

Doors 32 and 34 are shown in their normal, closed positions, door 32 being provided with a hinge barrel 146 at its forward edge which receives a hinge rod 148. Door 34 is mounted adjacent its forward edge for swinging movement about a horizontal hinge rod 150. Rods 148 and 150 extend in parallelism and are mounted on frame members of chassis 12. In FIG. 5 it may be seen that the rearward edge of door 32 overlies and is supported by hopper wall 142 when the door is down, whereas door 34 is supported in the closed position by an angle member 152 of the chassis frame.

A pair of angle members 154 are attached to wall structure 135 and end wall 138 respectively to present stops for door 32 when the latter is raised to its open position depicted by broken lines in FIG. 5. A pair of angle members 156 are also secured to structure 135 and end wall 138 in spaced relationship to members 154 and serve as stops for door 34 when the latter is raised to its open, broken line position (FIG. 5).

Opening of doors 32 and 34 is effected by actuation of a hydraulic piston and cylinder assembly 158 having a piston rod 160 pinned to a crank arm 162 rigid with the end of hinge barrel 146, and pinned to an arm 164 pivotally connected to a crank arm 166 rigid with the end of a horizontal shaft 168 rotatably carried by chassis 12 beneath door 34. Shaft 168 is connected to the underside of door 34 by three pairs of pivotally interconnected links 170 and 172 spaced longitudinally of shaft 168, each link 170 being rigid with the shaft while the other link 172 is pinned to a rib on the underside of door 34. As illustrated, doors 32 and 34 are of ribbed construction to reinforce the panel portions thereof.

A stop bar 174 overlies platform 28 in front of doors 32 and 34 in the portion of the platform which supports the rear wheels of a dump truck when the latter is driven thereupon to the dumping location. Bar 174 serves as a stop for the rear wheels of the truck and is useful primarily as a means of defining the proper position of the wheels for the dumping of material from the truck bed into hopper 36 upon opening of doors 32 and 34. The hump which would necessarily be experienced in driving over hinge barrel 146 is alleviated by two pairs of inclined plates 176.

In operation, with hopper 36 loaded, transport 10 traverses either the foot (as illustrated) or the crest of embankment 70 and conveyor unit 90 discharges the material into spreader 112 which, in turn, deposits the material on the embankment in a layer of desired thickness and width. Depending upon the staggering of layers 72, it may not be necessary to change the position of conveyor unit 90 for several passes; however, ultimately conveyor 90 will have to be shifted to realign the discharge end thereof in use with spreader 112. When this is required, the winch drums 118 are rotated in the proper direction until the discharge chute 108 or 110 of conveyor 90 is realigned with spreader 112.

It will be appreciated that an entire embankment may be faced with protective material without any equipment ever traversing the slope other than the small spreader 112 and its tractor 114 due to the long reach of boom 56 and the reversibility of the conveyor belt 98 of unit 90. Thus, locations spaced laterally of transport 10 a great distance or a short distance may be readily reached. Manifestly, for close-in work, discharge chute 110 would be employed, the other chute 108 being utilized when passes are made to lay the material at more remote locations. Additionally, as illustrated in FIG. 8, the boom 56 may be changed from an upwardly inclined to a downwardly extending position to enable half of the slope to be faced with the transport 10 located at the foot of the embankment and the upper half faced with the transport located at the crest of the embankment.

Steering of transport 10 may be automated if desired by utilizing a conventional string line 178 shown in FIG. 1 in conjunction with a sensor arm (not shown) riding thereon which controls the steering mechanism without operator attention. Since transport 10 moves at a relatively slow speed, dump trucks with a fresh supply of soil-cement may be driven onto platform 28 up ramp 26 while the apparatus is moving to provide continual resupply. A loaded truck advances up ramp 26 with doors 32 and 34 closed and passes over the doors and wheel stop 174 until its rear wheels are in proper alignment with stop 174. The hydraulic actuator assembly 158 is then operated to raise door 32 until it rests against its stops 154, door 34 being simultaneously raised until it abuts stop 156 and is held in position by the extended linkages 170, 172. The doors then no longer cover the hopper but form hopper extensions so that the sidewalls 140 and 142 now effectively extend to approximately the height of the end walls 136 and 138. The bed of the dump truck is then raised; the upper edge of door 32 will be disposed just beneath the rear of the bed at this time.

It will be appreciated in FIGS. 5 and 6 that the upper stretch of conveyor belt 74 beneath hopper 36 effectively forms the floor of the hopper and, therefore, receives the material and transports the same to conveyor unit 90. The amount of material removed from the hopper during a given interval of time may be controlled by utilizing an adjustable strike-off gate 180 (FIG. 6) which is mounted on the lower portion of hopper end wall 136. The gate 180 comprises a vertically adjustable plate which extends the horizontal length of end wall 136 and, in accordance with its position, defines an opening 182 of desired size in the vertical plane of the lower portion of end wall 136 between the lower lip of gate 180 and the upper stretch of belt 74.

Having thus described the invention, what is claimed as new and desired to be secured by Letters Patent is:

1. A material laying machine comprising:
a material transport; and
apparatus carried by said transport for removing the material therefrom and having a discharge unit disposed to deposit the material alongside the transport as the latter is advanced,
said unit being movable laterally of the transport toward and away from the latter whereby the material is discharged in a number of layers each at a preselected location spaced from the transport,
said transport having an elevated platform provided with a material carrier support, a ramp for said carrier presenting an outer end provided with a ground-engaging roller and extending fore and aft of the transport in disposition to guide the carrier upwardly and onto said support, and a hopper beneath the platform for receiving the material from the carrier when the latter is on the support,
said platform including a cover for said hopper having a pair of juxtaposed doors between the support and the ramp mounted for swinging movement about axes extending laterally of said transport substantially in the plane of said platform, the doors being shiftable to an open position to present hopper extensions for directing the material from the carrier into the hopper,
said doors having a closed position in which the doors and the support are coplanar, there being stops disposed for engagement by the doors to define said open position thereof upon upward swinging of the doors about said axes, whereby the carrier may be driven up the ramp and over the doors to the support and the doors thereupon opened to permit dumping of the material from the carrier into the hopper,
said apparatus having a portion disposed beneath the hopper for receiving the material from the latter.

2. In combination with a spreader adapted to traverse the sloping surface of an embankment back-and-forth at progressively greater distances from the foot thereof to deposit a construction material on said surface, a machine for traversing a roadway presented by the crest of the embankment or said foot thereof to continuously resupply the spreader with said material as the spreader advances along said surface, said machine comprising:
a transport adapted to ride on said roadway and provided with a prime mover for driving the same in first one direction and then the opposite direction, alternately, along a path of travel defined by said roadway,
said transport having a material receiver, and a ramp extending fore and aft of the transport in substantial alignment with said path of travel and disposed to receive material-carrying supply vehicles traversing said path to guide each vehicle onto the transport for unloading of its supply of material into said receiver;
apparatus carried by said transport for removing the material from said receiver and delivering the material to said spreader alongside the transport, and including a discharge unit movable laterally of the transport toward and away from the latter; and
a boom on the transport extending laterally therefrom and supporting said unit for up-and-down movement and for said lateral movement thereof to align the unit with said spreader for discharge of the material thereinto and to maintain the unit in a delivery position with respect to the spreader as the latter traverses said surface.

3. The invention of claim 2,
said boom including a pair of rails extending laterally of the transport,
said unit including a conveyor shiftable along the rails,
said apparatus including means for delivering the material to said conveyor,
the conveyor having a discharge end and means for moving the material delivered thereto to said end for gravitation therefrom.

4. The invention of claim 2,
said boom including a pair of elongated rails extending laterally of the transport,
said unit including an elongated conveyor of the continuous belt type provided with means suspending the conveyor beneath the rails in generally parallel relationship thereto for said lateral movement of the conveyor along said rails,
said apparatus including means for directing the material onto said conveyor from above the latter,
said conveyor having a pair of opposed discharge ends and a reversible drive for effecting discharge of the material thereon from either of said ends.

5. The invention of claim 2,
said apparatus further including a primary conveyor extending from said receiver along said boom,
said unit comprising a secondary conveyor shiftable longitudinally of the boom and having a discharge end laterally spaced from the transport,
said primary conveyor being disposed to deliver the material to said secondary conveyor.

6. The invention of claim 2,
said unit having a pair of spaced discharge ends, one disposed remote from the transport, the other disposed between the transport and said one end, and
said unit being provided with means for moving the material alternately to either of said ends.

References Cited

UNITED STATES PATENTS

| | | | |
|---|---|---|---|
| 3,378,152 | 4/1968 | Warner | 214—46 |
| 641,532 | 1/1900 | Mussetter | 198—89 |
| 3,294,214 | 12/1966 | Tweten | 198—89 |
| 3,342,352 | 9/1967 | Sackett | 198—101 |
| 3,348,707 | 10/1967 | Anstee | 214—44 |

FOREIGN PATENTS

| | | |
|---|---|---|
| 34,997 | 9/1925 | Denmark. |
| 422,757 | 12/1925 | Germany. |

ROBERT G. SHERIDAN, *Primary Examiner.*

U.S. Cl. X.R.

198—89; 214—10